US010713129B1

(12) United States Patent
Tummala et al.

(10) Patent No.: US 10,713,129 B1
(45) Date of Patent: Jul. 14, 2020

(54) SYSTEM AND METHOD FOR IDENTIFYING AND CONFIGURING DISASTER RECOVERY TARGETS FOR NETWORK APPLIANCES

(71) Applicant: EMC IP Holding Company LLC, Hopkinton, MA (US)

(72) Inventors: Himabindu Tummala, South Grafton, MA (US); Daniel E. Cummins, Hudson, NH (US); Susmitha Pillarisetty, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 492 days.

(21) Appl. No.: 15/391,142

(22) Filed: Dec. 27, 2016

(51) Int. Cl.
*G06F 11/20* (2006.01)
*G06F 11/14* (2006.01)
*G06F 9/50* (2006.01)

(52) U.S. Cl.
CPC ...... *G06F 11/2023* (2013.01); *G06F 11/1446* (2013.01); *G06F 11/1458* (2013.01); *G06F 9/505* (2013.01); *G06F 9/5044* (2013.01); *G06F 11/1456* (2013.01); *G06F 11/1464* (2013.01); *G06F 11/203* (2013.01); *G06F 11/2025* (2013.01); *G06F 11/2033* (2013.01); *G06F 2201/805* (2013.01)

(58) Field of Classification Search
CPC ............. G06F 11/1446; G06F 11/1456; G06F 11/1458; G06F 11/1464; G06F 11/20; G06F 11/2023; G06F 11/2025; G06F 11/203; G06F 11/2033; G06F 11/2035; G06F 9/5011; G06F 9/5027; G06F 9/5044; G06F 9/505
See application file for complete search history.

(56) References Cited

U.S. PATENT DOCUMENTS

| 2007/0276885 A1* | 11/2007 | Valiyaparambil ... G06F 11/1451 |
| 2008/0256549 A1* | 10/2008 | Liu ........................ G06F 9/4881 718/106 |
| 2009/0276771 A1* | 11/2009 | Nickolov .............. G06F 9/4856 717/177 |
| 2011/0047190 A1* | 2/2011 | Lee ..................... H04L 67/1095 707/803 |

(Continued)

OTHER PUBLICATIONS

Hyper-converged systems: What you need to know about this hot virtualization topic by Keith Townsend published Jun. 20, 2014 https://www.techrepublic.com/article/hyper-converged-systems-what-you-need-to-know-about-this-hot-virtualization-topic/ (Year: 2014).*

*Primary Examiner* — Joseph O Schell
(74) *Attorney, Agent, or Firm* — Brian J. Colandreo; Mark H. Whittenberger; Holland & Knight LLP

(57) ABSTRACT

A method, computer program product, and computing system for identifying one or more disaster recovery requirements for a network appliance, wherein the network appliance includes both storage functionality and compute functionality. The one or more disaster recovery requirements are provided to a potential disaster recovery target for the network appliance. The potential disaster recovery target is analyzed to determine if the potential disaster recovery target meets the one or more disaster recovery requirements of the network appliance. If the potential disaster recovery target meets the one or more disaster recovery requirements, the potential disaster recovery target is configured as a disaster recovery site for the network appliance.

21 Claims, 4 Drawing Sheets

(56) References Cited

U.S. PATENT DOCUMENTS

| | | | |
|---|---|---|---|
| 2011/0231696 A1* | 9/2011 | Ji | G06F 11/1438 714/3 |
| 2013/0067277 A1* | 3/2013 | Mummidi | G06F 11/2097 714/19 |
| 2014/0130055 A1* | 5/2014 | Guha | G06F 3/0604 718/104 |
| 2014/0143427 A1* | 5/2014 | Hohenstein | H04L 67/16 709/226 |
| 2014/0149784 A1* | 5/2014 | Ngo | H04L 67/1008 714/4.11 |
| 2015/0378853 A1* | 12/2015 | Sevigny | G06F 11/2023 714/4.11 |
| 2016/0139949 A1* | 5/2016 | Jagannath | G06F 9/5022 718/1 |
| 2016/0179636 A1* | 6/2016 | Fitzpatrick | G06F 11/203 714/4.12 |
| 2017/0060608 A1* | 3/2017 | Raghunathan | G06F 9/45558 |
| 2017/0199770 A1* | 7/2017 | Peteva | G06F 9/5088 |

* cited by examiner

SYSTEM AND METHOD FOR IDENTIFYING AND CONFIGURING DISASTER RECOVERY TARGETS FOR NETWORK APPLIANCES

TECHNICAL FIELD

This disclosure relates to disaster recovery systems and, more particularly, to disaster recovery systems for virtualized storage systems.

BACKGROUND

Storing and safeguarding electronic content is of paramount importance in modern business. Accordingly, various methodologies may be employed to protect and distribute such electronic content. For example, high-availability, hyperconverged systems may be utilized to provide users with access to virtual machines (and associated storage) that are custom tailored to the needs and desires of the user. Unfortunately and when utilizing such hyperconverged systems; virtual machines, associated storage, compute, and network connectivity may all need to be considered when defining a disaster recovery site.

SUMMARY OF DISCLOSURE

In one implementation, a computer-implemented method is executed on a computing system and includes identifying one or more disaster recovery requirements for a network appliance, wherein the network appliance includes both storage functionality and compute functionality. The one or more disaster recovery requirements are provided to a potential disaster recovery target for the network appliance. The potential disaster recovery target is analyzed to determine if the potential disaster recovery target meets the one or more disaster recovery requirements of the network appliance. If the potential disaster recovery target meets the one or more disaster recovery requirements, the potential disaster recovery target is configured as a disaster recovery site for the network appliance.

One or more of the following features may be included. The network appliance may be a hyperconverged network storage system that includes a hypervisor for executing one or more virtual machines. The one or more disaster recovery requirements may include one or more of: at least one storage requirement; at least one compute requirement; and at least one network requirement. The at least one compute requirement may include one or more of: at least one physical hardware requirement and at least one virtual machine. The at least one storage requirement may include one or more logical storage units associated with the at least one virtual machine. The at least one storage requirement may include one or more logical storage units associated with one or more application servers external to the network appliance. Configuring the potential disaster recovery target as a disaster recovery site for the network appliance may include one or more of: maintaining a current copy of data stored within the network appliance on the disaster recovery site; maintaining a current copy of one or more virtual machines executed on the network appliance on the disaster recovery site; and reserving computer resources within the potential disaster recovery target for exclusive use by the disaster recovery site.

In another implementation, a computer program product resides on a computer readable medium and has a plurality of instructions stored on it. When executed by a processor, the instructions cause the processor to perform operations including identifying one or more disaster recovery requirements for a network appliance, wherein the network appliance includes both storage functionality and compute functionality. The one or more disaster recovery requirements are provided to a potential disaster recovery target for the network appliance. The potential disaster recovery target is analyzed to determine if the potential disaster recovery target meets the one or more disaster recovery requirements of the network appliance. If the potential disaster recovery target meets the one or more disaster recovery requirements, the potential disaster recovery target is configured as a disaster recovery site for the network appliance.

One or more of the following features may be included. The network appliance may be a hyperconverged network storage system that includes a hypervisor for executing one or more virtual machines. The one or more disaster recovery requirements may include one or more of: at least one storage requirement; at least one compute requirement; and at least one network requirement. The at least one compute requirement may include one or more of: at least one physical hardware requirement and at least one virtual machine. The at least one storage requirement may include one or more logical storage units associated with the at least one virtual machine. The at least one storage requirement may include one or more logical storage units associated with one or more application servers external to the network appliance. Configuring the potential disaster recovery target as a disaster recovery site for the network appliance may include one or more of: maintaining a current copy of data stored within the network appliance on the disaster recovery site; maintaining a current copy of one or more virtual machines executed on the network appliance on the disaster recovery site; and reserving computer resources within the potential disaster recovery target for exclusive use by the disaster recovery site.

In another implementation, a computing system includes a processor and a memory system configured to perform operations including identifying one or more disaster recovery requirements for a network appliance, wherein the network appliance includes both storage functionality and compute functionality. The one or more disaster recovery requirements are provided to a potential disaster recovery target for the network appliance. The potential disaster recovery target is analyzed to determine if the potential disaster recovery target meets the one or more disaster recovery requirements of the network appliance. If the potential disaster recovery target meets the one or more disaster recovery requirements, the potential disaster recovery target is configured as a disaster recovery site for the network appliance.

One or more of the following features may be included. The network appliance may be a hyperconverged network storage system that includes a hypervisor for executing one or more virtual machines. The one or more disaster recovery requirements may include one or more of: at least one storage requirement; at least one compute requirement; and at least one network requirement. The at least one compute requirement may include one or more of: at least one physical hardware requirement and at least one virtual machine. The at least one storage requirement may include one or more logical storage units associated with the at least one virtual machine. The at least one storage requirement may include one or more logical storage units associated with one or more application servers external to the network appliance. Configuring the potential disaster recovery target as a disaster recovery site for the network appliance may include one or more of: maintaining a current copy of data stored within the network appliance on the disaster recovery site; maintaining a current copy of one or more virtual machines executed on the network appliance on the disaster recovery site; and reserving computer resources within the potential disaster recovery target for exclusive use by the disaster recovery site.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
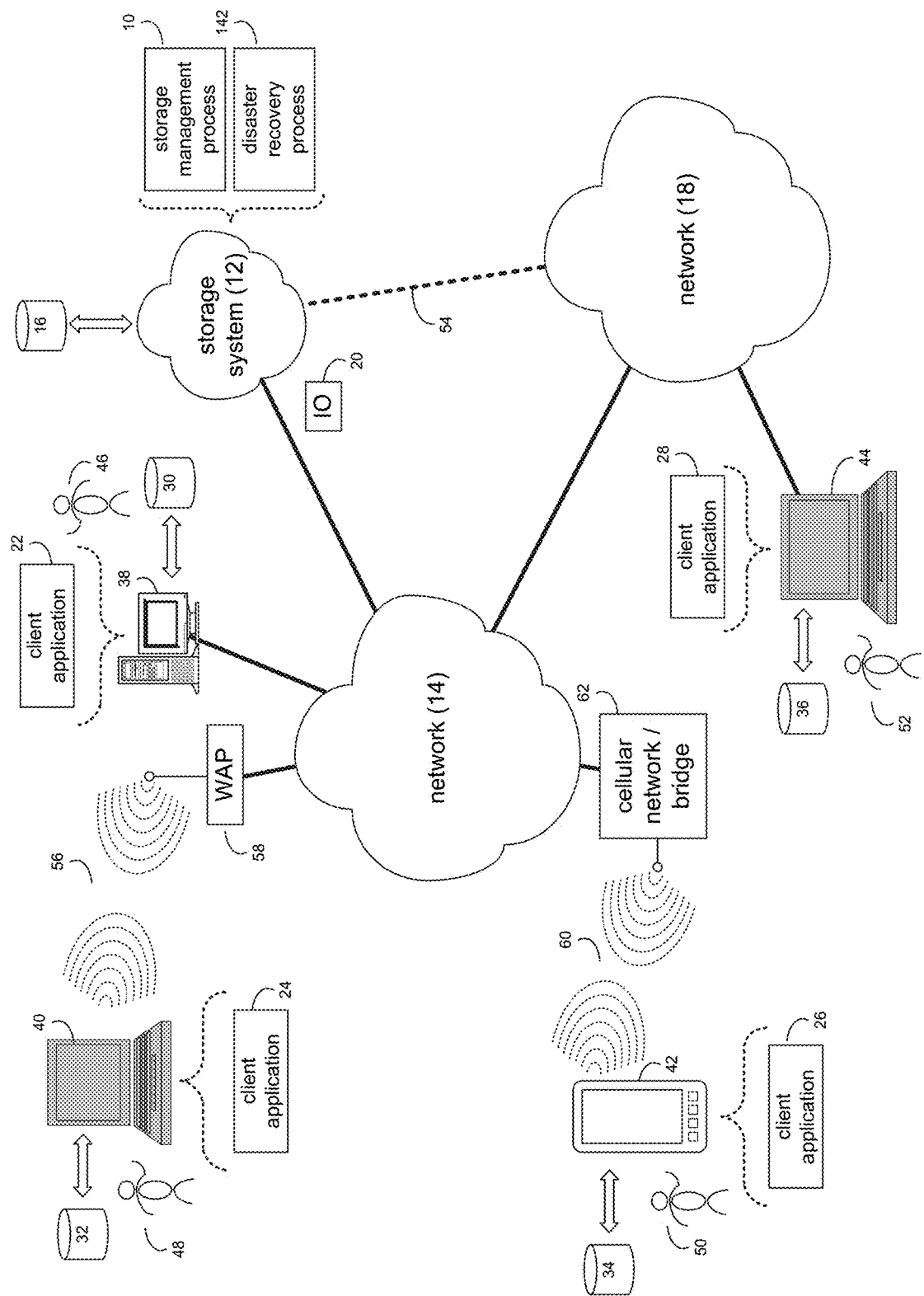
FIG. 1 is a diagrammatic view of a storage system, a disaster recovery process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
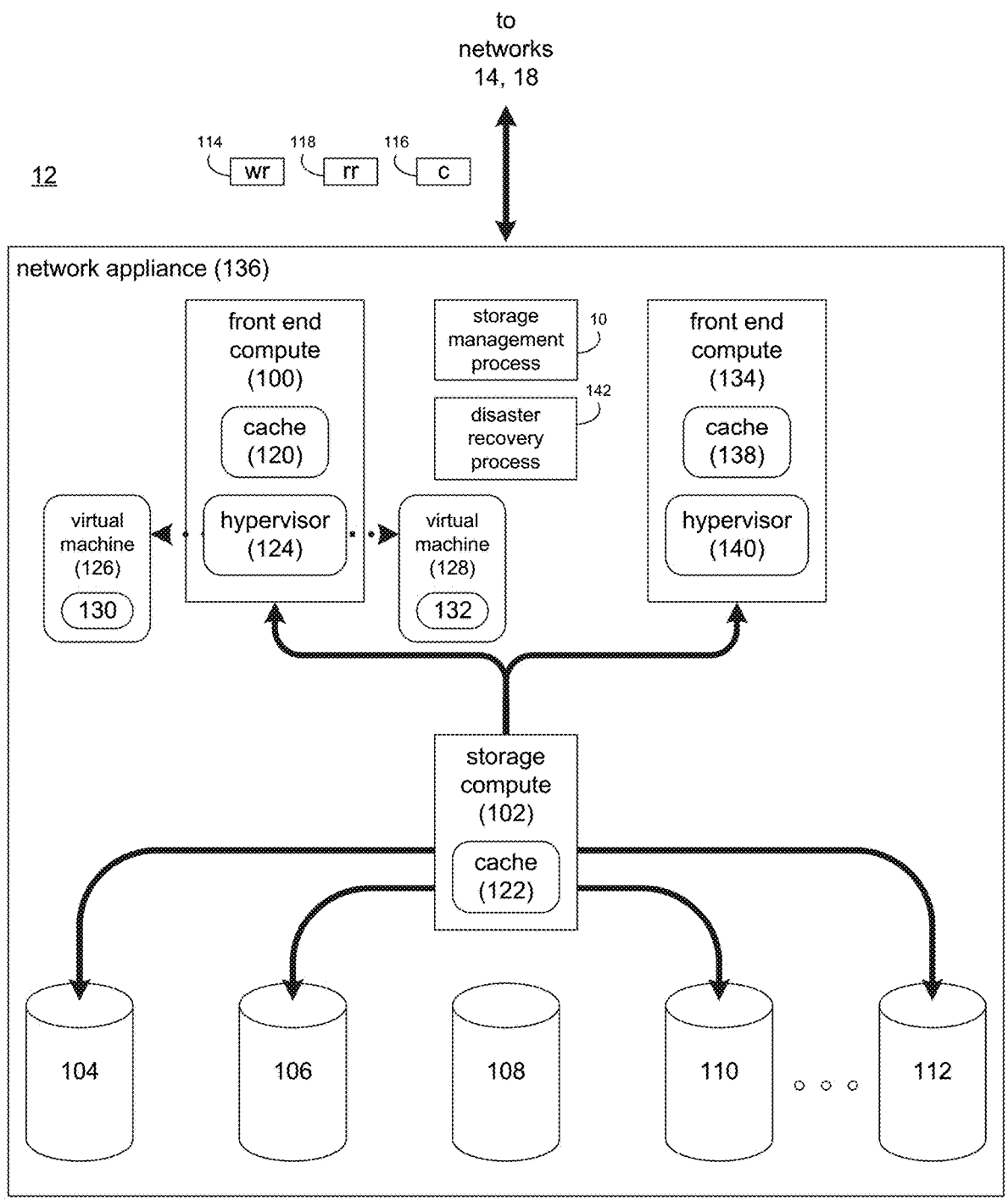
FIG. 2 is a diagrammatic view of the storage system of FIG. 1.

Storage System:

Referring also to FIG. 2, there is shown a general and illustrative implementation of storage system 12 (or a portion thereof). In this general and illustrative implementation, data storage system 12 may include front end compute 100, storage compute 102 and a plurality of storage targets (e.g. storage targets 104, 106, 108, 110, 112). Storage targets 104, 106, 108, 110, 112 may be configured to provide various levels of performance and/or high availability. For example, one or more of storage targets 104, 106, 108, 110, 112 may be configured as a RAID 0 array, in which data is striped across storage targets. By striping data across a plurality of storage targets, improved performance may be realized. However, RAID 0 arrays do not provide a level of high availability. Accordingly, one or more of storage targets 104, 106, 108, 110, 112 may be configured as a RAID 1 array, in which data is mirrored between storage targets. By mirroring data between storage targets, a level of high availability is achieved as multiple copies of the data are stored within storage system 12.

While storage targets 104, 106, 108, 110, 112 are discussed above as being configured in a RAID 0 or RAID 1 array, this is for illustrative purposes only and is not intended to be a limitation of this disclosure, as other configurations are possible. For example, storage targets 104, 106, 108, 110, 112 may be configured as a RAID 3, RAID 4, RAID 5, RAID 6 or RAID 7 array.

While in this particular example, storage system 12 is shown to include five storage targets (e.g. storage targets 104, 106, 108, 110, 112), this is for illustrative purposes only and is not intended to be a limitation of this disclosure. Specifically, the actual number of storage targets may be increased or decreased depending upon e.g. the level of redundancy/performance/capacity required.

One or more of storage targets 104, 106, 108, 110, 112 may be configured to store coded data, wherein such coded data may allow for the regeneration of data lost/corrupted on one or more of storage targets 104, 106, 108, 110, 112. Examples of such coded data may include but is not limited to parity data and Reed-Solomon data. Such coded data may be distributed across all of storage targets 104, 106, 108, 110, 112 or may be stored within a specific storage device. Examples of storage targets 104, 106, 108, 110, 112 may include one or more electro-mechanical hard disk drives and/or solid-state/flash devices.

Storage system 12 may execute all or a portion of storage management process 10. The instruction sets and subroutines of storage management process 10, which may be stored on a storage device (e.g., storage device 16) coupled to front end compute 100 and/or storage compute 102, may be executed by one or more processors (not shown) and one or more memory architectures (not shown) included within front end compute 100 and/or storage compute 102. Storage device 16 may include but is not limited to: a hard disk drive; a RAID device; random access memory (RAM); read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when front end compute 100 is configured as an application server, these IO requests may be internally generated within front end compute 100. Examples of IO request 20 may include but are not limited to data write request 114 (i.e. a request that content 116 be written to storage system 12) and data read request 118 (i.e. a request that content 116 be read from storage system 12).

During operation of front end compute 100, content 116 to be written to storage system 12 may be processed by front end compute 100. Additionally/alternatively and when front end compute 100 is configured as an application server, content 116 to be written to storage system 12 may be internally generated by front end compute 100.

Front end compute 100 may include frontend cache memory system 120. Examples of frontend cache memory system 120 may include but are not limited to a volatile, solid-state, cache memory system (e.g., a dynamic RAM cache memory system) and/or a non-volatile, solid-state, cache memory system (e.g., a flash-based, cache memory system).

Front end compute 100 may initially store content 116 within frontend cache memory system 120. Depending upon the manner in which frontend cache memory system 120 is configured, front end compute 100 may immediately provide content 116 to storage compute 102 (if frontend cache memory system 120 is configured as a write-through cache) or may subsequently provide content 116 to storage compute 102 (if frontend cache memory system 120 is configured as a write-back cache).

Storage compute 102 may include backend cache memory system 122. Examples of backend cache memory system 122 may include but are not limited to a volatile, solid-state, cache memory system (e.g., a dynamic RAM cache memory system) and/or a non-volatile, solid-state, cache memory system (e.g., a flash-based, cache memory system). During operation of storage compute 102, content 116 to be written to storage targets 104, 106, 108, 110, 112 may be received from front end compute 100. Storage compute 112 may initially store content 116 within backend cache memory system 122 prior to being stored on e.g. one or more of storage targets 104, 106, 108, 110, 112.

Front end compute 100 may include and/or execute a hypervisor (e.g., hypervisor 124) that may allow for the execution of one or more virtual machines (e.g., virtual machines 126, 128). As is known in the art, a hypervisor (e.g., hypervisor 124) is a piece of computer software, firmware and/or hardware that creates and runs virtual machines (e.g., virtual machines 126, 128), wherein the hypervisor (e.g., hypervisor 124) may present and manage a guest operating system on a virtual operating platform. Therefore, multiple instantiations of a variety of operating systems may be effectuated on shared hardware resources. For example, Linux™, Windows™, and Mac™ operating system instantiations may all run on a single physical x86 system.

Accordingly, virtual machines 126, 128 may be emulations of a physical computer system. For example, virtual machine 126 may be configured to provide the functionality of a Windows™ based computing system and may allow for the execution of Windows-based application 130, while virtual machine 128 may be configured to provide the functionality of a Linux™ based computing system and may allow for the execution of Linux-based application 132.

Front end compute 100 and/or storage compute 102 may include one or more physical hardware components (not shown) that may be configurable by hypervisor 124 to form virtual machines (e.g., virtual machines 126, 128). Examples of these physical hardware components may include but are not limited to: hard drives (e.g., storage targets 104, 106, 108, 110, 112), RAID arrays (e.g., formed by storage targets 104, 106, 108, 110, 112), host bus adapters, network controllers, processor cores, cache memory architectures (e.g., front end cache memory system 120 and/or backend cache memory system 122), volatile memory architectures, and persistent memory architectures. Accordingly and when virtual machine 126 and/or virtual machine 128 are executed on hypervisor 124, various portions of these physical hardware components may be assigned to/mapped to virtual machine 126 and/or virtual machine 128.

In order to provide a higher-level of availability and/or a higher level of performance, one or more additional front end computes (e.g., front end compute 134), may be included, wherein the combination of front end compute 100, front end compute 134, storage compute 102 and storage targets 104, 106, 108, 110, 112 may form network appliance 136. Front end compute 134 may be configured in a manner similar to front end compute 100 and, therefore, may include a front end cache system (e.g., front end cache 138) and may include and/or execute a hypervisor (e.g., hypervisor 140).

Disaster Recovery Process:

Disaster recovery process 142 may be configured to allow for administration of a disaster recovery site for network appliance 136. The instruction sets and subroutines of disaster recovery process 142, which may be stored on a storage device (e.g., storage device 16) coupled to front end compute 100, front end compute 134 and/or storage compute 102, may be executed by one or more processors (not shown) and one or more memory architectures (not shown) included within front end compute 100, front end compute 134 and/or storage compute 102.

Figure 3:
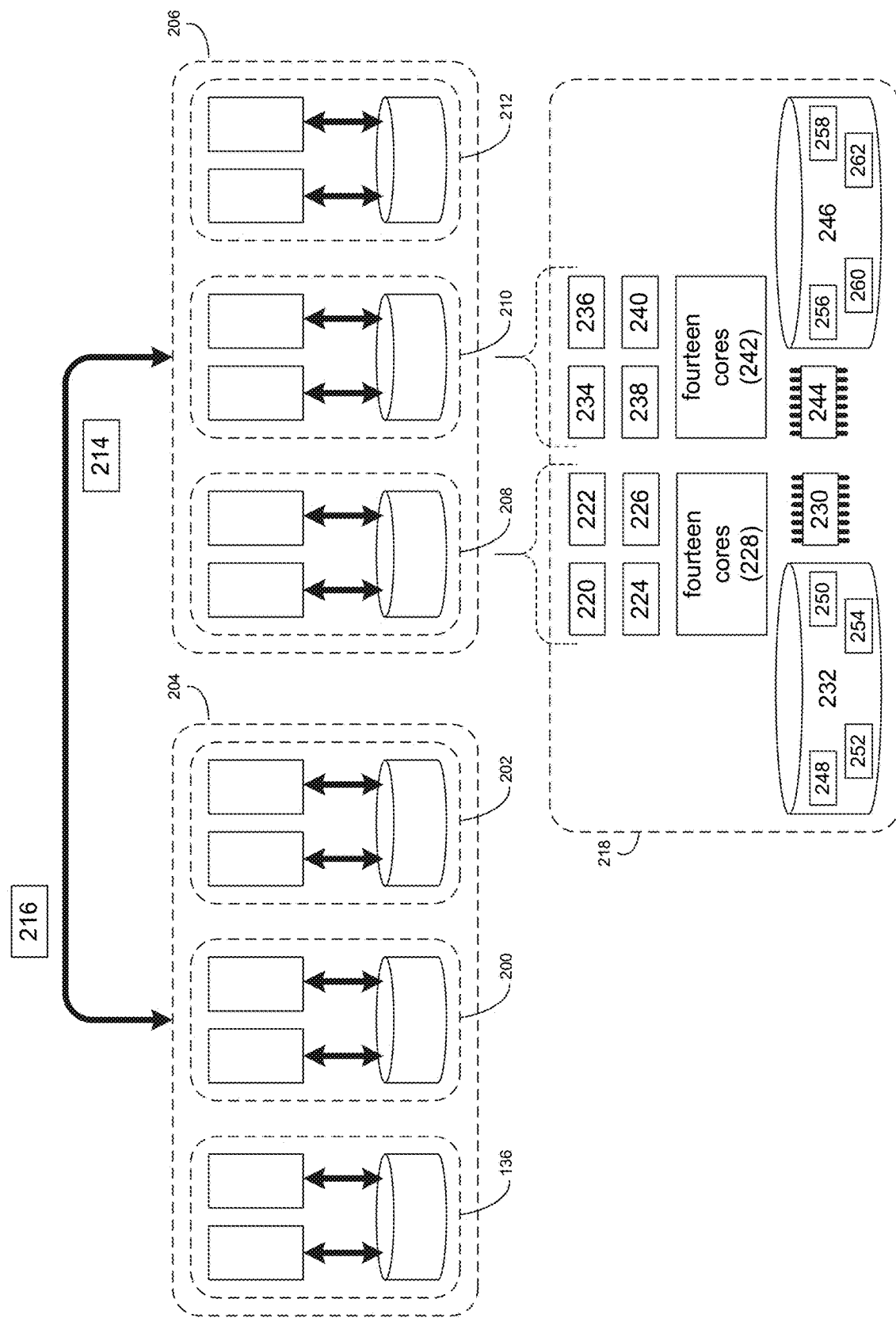
FIG. 3 is another diagrammatic view of the storage system of FIG. 1.

Referring also to FIG. 3, a plurality of network appliances 136, 200, 202 may be grouped to form a cluster (e.g., cluster 204), wherein multiple clusters (e.g., clusters 204, 206) may be interconnected. While in this example, cluster 204 and cluster 206 are each shown to include three network appliances (e.g., network appliances 136, 200, 202 for cluster 204 and network appliances 208, 210, 212 for cluster 206), this is for illustrative purposes only and is not intended to be a limitation of this disclosure, as other configuration are possible.

Figure 4:
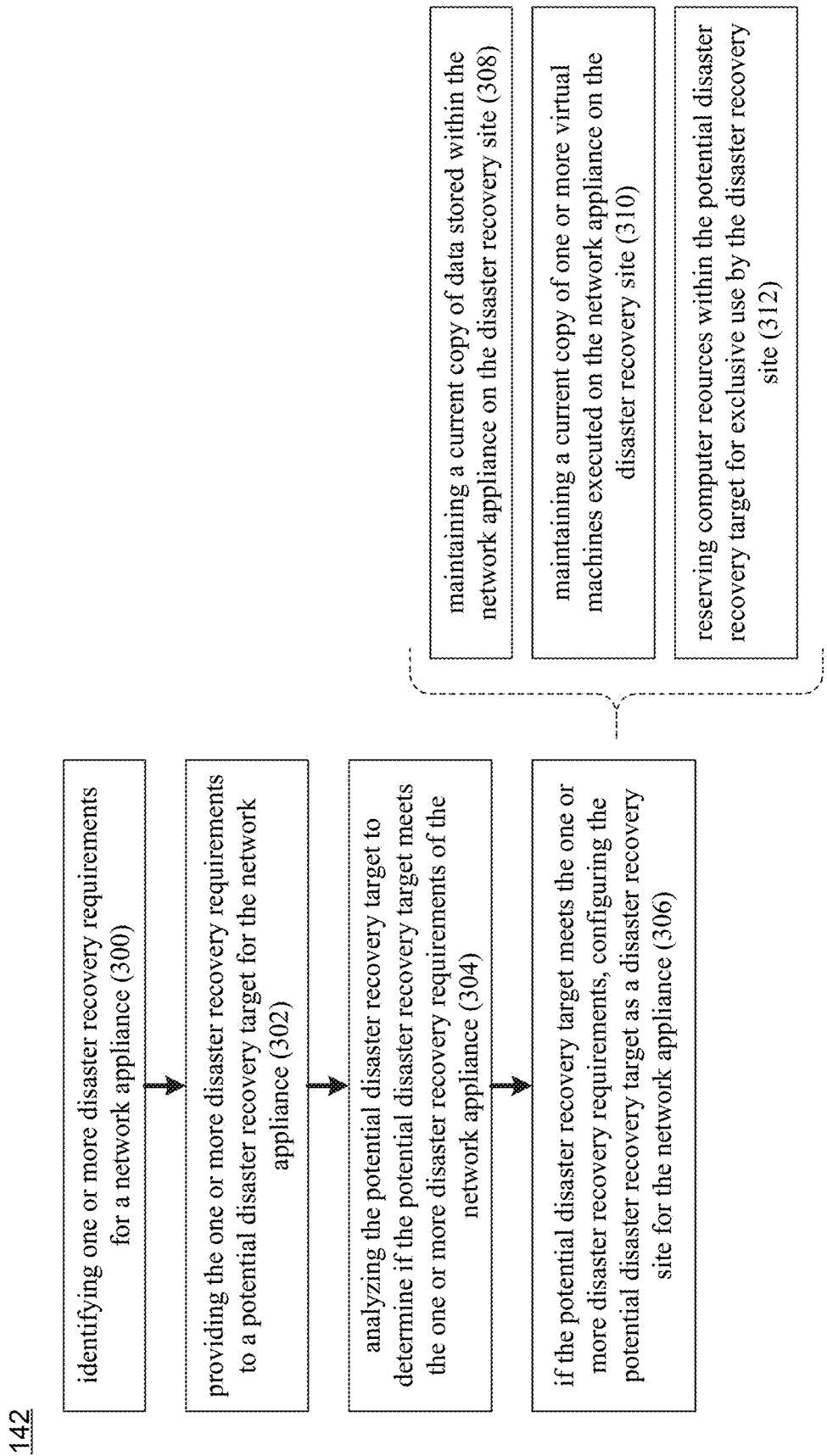
FIG. 4 is a flow chart of the disaster recovery process of FIG. 1.

Referring also to FIG. 4 and as discussed above, disaster recovery process 10 may be configured to allow for administration of a disaster recovery site for network appliance 136. Accordingly, disaster recovery process 142 may identify 300 one or more disaster recovery requirements for network appliance 136. Examples of these one or more disaster recovery requirements may include but are not limited to one or more of: at least one storage requirement; at least one compute requirement; and at least one network requirement. For example, the at least one compute requirement may include (but is not limited to) one or more of at least one physical hardware requirement and at least one virtual machine; and the at least one storage requirement may include (but is not limited to) one or more logical storage units associated with the at least one virtual machine.

An example of network appliance 136 may include but is not limited to a hyperconverged network storage system that includes both storage functionality and compute functionality. As discussed above, network appliance 136 may include and/or execute a hypervisor (e.g., hypervisor 124) that may allow for the execution of one or more virtual machines.

Assume for this example that disaster recovery process 142 identifies 300 the following disaster recovery requirements for network appliance 136:
- Network appliance 136 is executing eight virtual machines, which are providing a level of performance that e.g., meets (or exceeds) their service level agreement.
- Network appliance 136 includes twenty-eight processor cores, of which sixteen of the twenty-eight processor cores are available for execution of the eight virtual machines and twelve of the twenty-eight processor cores are available for effectuating the storage of data within network appliance 136.
- Network appliance 136 includes two-hundred-fifty-six gigabytes of RAM, of which one-hundred-ninety-six gigabytes are available for the eight virtual machines.
- Network appliance 136 includes one-hundred-twenty-eight terabytes of storage, from which 8 sixteen terabyte LUNS are defined (i.e., one for each of the eight virtual machines), wherein a LUN is a logical storage unit that derived from physical storage.

Once identified, disaster recovery process 142 may provide 302 the disaster recovery requirements (e.g., requirements 214) to a potential disaster recovery target for network appliance 136. Assume that disaster recovery process 142 identifies cluster 206 as the potential disaster recovery target. For example, each cluster (e.g., cluster 204 and cluster 206) may have an IP management address to which messages may be directed. For example, IP management address 192.168.1.100 may be associated with cluster 204 and IP management address 192.168.1.101 may be associated with cluster 206.

Accordingly, disaster recovery process 142 may provide 302 requirements 214 to IP management address 192.168.1.101 associated with cluster 206 (i.e., the potential disaster recovery target for network appliance 136).

Disaster recovery process 142 may then analyze 304 the potential disaster recovery target to determine if the potential disaster recovery target meets the one or more disaster recovery requirements (e.g., requirements 214) of network appliance 136. As discussed above, requirements 214 define eight virtual machines, twenty-eight processor cores, two-hundred-fifty-six gigabytes of RAM and one-hundred-twenty-eight terabytes of storage.

Accordingly, disaster recovery process 142 may analyze 304 network appliances 208, 210, 212 within cluster 206 to determine if one of network appliances 208, 210, 212 (or a combination of network appliances 208, 210, 212) has enough resources available to meet (or exceed) the disaster recovery requirements (e.g., requirements 214) of network appliance 136.

If the potential disaster recovery target (e.g., one or more of network appliances 208, 210, 212 within cluster 206) does not meet the disaster recovery requirements (e.g., requirements 214) of network appliance 136, disaster recovery process 142 may inform cluster 204 by e.g., providing a failure message (e.g., failure message 216) to IP management address 192.168.1.100 associated with cluster 204.

If the potential disaster recovery target (e.g., one or more of network appliances 208, 210, 212 within cluster 206) meets the disaster recovery requirements (e.g., requirements 214) of network appliance 136, disaster recovery process 142 may configure 306 the potential disaster recovery target (e.g., one or more of network appliances 208, 210, 212 within cluster 206) as a disaster recovery site for network appliance 136.

Assume that when disaster recovery process 142 analyzes 304 network appliances 208, 210, 212 within cluster 206, disaster recovery process 142 determines that none of network appliances 208, 210, 212 individually has enough resources available to meet the disaster recovery requirements (e.g., requirements 214) of network appliance 136. However, assume that disaster recovery process 142 determines that the combination of network appliance 208 and network appliance 210 has enough resources available to meet the disaster recovery requirements (e.g., requirements 214) of network appliance 136. Accordingly, disaster recovery process 142 may configure 306 the combination of network appliance 208 and network appliance 210 as disaster recovery site 218 for network appliance 136.

When configuring 306 the potential disaster recovery target as disaster recovery site 218 for network appliance 136, disaster recovery process 142 may maintain 308 a current copy of data stored within network appliance 136 on disaster recovery site 218 (i.e., the combination of network appliance 208 and network appliance 210); may maintain 310 a current copy of one or more virtual machines executed on network appliance 136 on disaster recovery site 218 (i.e., the combination of network appliance 208 and network appliance 210); and may reserve 312 computer resources within the potential disaster recovery target for exclusive use by disaster recovery site 218 (i.e., the combination of network appliance 208 and network appliance 210). Additionally, disaster recovery process 142 may validate these computer resource reservations against future virtual machine resource requirements. Therefore, in the event that the requirements of a virtual machine change (e.g., increase or decrease), the computer resources reserved for the associated disaster recovery site may also be increased or decreased based upon the requirement changes of the virtual machine.

As discussed above and for this example, requirements 214 define eight virtual machines, twenty-eight processor cores, two-hundred-fifty-six gigabytes of RAM and one-hundred-twenty-eight terabytes of storage. Assume that each of network appliances 208, 210 can support four virtual machines (for a total of eight virtual machines), provide fourteen processor cores (for a total of twenty-eight processor cores), provide one-hundred-twenty-eight gigabytes of RAM (for a total of two-hundred-fifty-six gigabytes of RAM) and provide sixty-four terabytes of storage (for a total of one-hundred-twenty-eight terabytes of storage).

Accordingly, network appliance 208 can execute virtual machines 220, 222, 224, 226, can provide fourteen processor cores (e.g., processor cores 228), can provide one-hundred-twenty-eight gigabytes of RAM (e.g., RAM 230), and can provide sixty-four terabytes of storage (e.g., storage 232). Further, network appliance 210 can execute virtual machines 234, 236, 238, 240, can provide fourteen processor cores (e.g., processor cores 242), can provide one-hundred-twenty-eight gigabytes of RAM (e.g., RAM 244), and can provide sixty-four terabytes of storage (e.g., storage 246).

As discussed above, a sixteen terabyte LUN may be defined for each of virtual machines 220, 222, 224, 226, 234, 236, 238, 240. Accordingly and since virtual machines 220, 222, 224, 226 are associated with network appliance 208, LUNs 248, 250, 252, 254 may be defined within storage 232 for virtual machines 220, 222, 224, 226 (respectively). Further and since virtual machines 234, 236, 238, 240 are associated with network appliance 210, LUNs 256, 258, 260, 262 may be defined within storage 246 for virtual machines 234, 236, 238, 240 (respectively).

Accordingly and as stated above, when configuring 306 disaster recovery site 218 for network appliance 136, disaster recovery process 142 may maintain 308 a current copy of data stored within network appliance 136 on disaster recovery site 218 (i.e., the combination of network appliance 208 and network appliance 210). Therefore, any data stored within the eight LUNs of network appliance 136 (as defined within requirements 214) may be copied to and maintained 308 current within LUNs 248, 250, 252, 254, 256, 258, 260, 262.

Additionally, disaster recovery process 142 may maintain 310 a current copy of one or more virtual machines executed on network appliance 136 on disaster recovery site 218 (i.e., the combination of network appliance 208 and network appliance 210). Therefore, the eight virtual machines being executed on network appliance 136 may be copied to and maintained 310 current on disaster recovery site 218 (as virtual machines 220, 222, 224, 226, 234, 236, 238, 240). Additionally, any applications that are executed within any of these virtual machines may be copied to and maintained current on disaster recovery site 218.

Further, disaster recovery process 142 may reserve 312 computer resources within (in this example) the combination of network appliance 208 and network appliance 210 for exclusive use by disaster recovery site 218.

Accordingly and in the event that network appliance 136 fails and disaster recovery site 218 needs to be put into use, the data within the eight LUNs of network appliance 136 has already been copied to and maintained 308 current by disaster recovery process 142 within disaster recovery site 218. Further, the eight virtual machines being executed within network appliance 136 (as well as their related applications) have been copied to and maintained 310 current by disaster recovery process 142 within disaster recovery site 218. And since the processing power of twenty-eight processor cores was provided by network appliance 136 (which has failed) and disaster recovery site 218 has reserved 312 twenty-eight processor cores (e.g., the combination of processor cores 228 and processor cores 242), disaster recovery site 218 may be quickly spun up to provide a high level of availability to users of failed network appliance 136.

As discussed above, requirements 214 may also define at least one network requirement (such as the requirements for various virtual LANs, redundancy requirements concerning the physical LANs underlying the virtual LANs, etc.) Accordingly and in such a situation, when (in this example) analyzing 304 network appliances 208, 210, 212 within cluster 206, disaster recovery process 142 may determine whether or not these network appliances being analyzed have enough resources available to meet (or exceed) the network requirements of network appliance 136.

As discussed above, various LUNs (e.g., LUNs 248, 250, 252, 254, 256, 258, 260, 262) may be defined for and utilized by various virtual machines (e.g., virtual machines 220, 222, 224, 226, 234, 236, 238, 240, respectively) and the applications executed therein. Disaster recovery process 142 may further be configured to allow one or more of these LUNs (or other LUNS, not shown) to be accessible to and/or associated with one or more application servers (not shown) external to (in this example) network appliance 136.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
   identifying one or more disaster recovery requirements for a network appliance, wherein the network appliance includes both storage functionality and compute functionality;
   providing the one or more disaster recovery requirements to a plurality of potential disaster recovery targets for the network appliance;
   analyzing the plurality of potential disaster recovery targets to determine if any of the potential disaster recovery targets meet the one or more disaster recovery requirements of the network appliance;
   if one of the potential disaster recovery targets individually meets the one or more disaster recovery requirements, configuring the potential disaster recovery target as a disaster recovery site for the network appliance, wherein configuring the potential disaster recovery target as a disaster recovery site for the network appliance includes:
   maintaining a current copy of data stored within the network appliance on the disaster recovery site, and
   maintaining a current copy of one or more virtual machines executed on the network appliance on the disaster recovery site; and
if none of the potential disaster recovery targets individually meets the one or more disaster recovery requirements, configuring a combination of the plurality of potential disaster recovery targets as a disaster recovery site for the network appliance, wherein configuring the combination of the plurality of potential disaster recovery targets as a disaster recovery site for the network appliance includes:
   maintaining a current copy of data stored within the network appliance on the disaster recovery site, and
   maintaining a current copy of one or more virtual machines executed on the network appliance on the disaster recovery site.

2. The computer-implemented method of claim 1 wherein the network appliance is a hyperconverged network storage system that includes a hypervisor for executing one or more virtual machines.

3. The computer-implemented method of claim 1 wherein the one or more disaster recovery requirements includes one or more of:
   at least one storage requirement;
   at least one compute requirement; and
   at least one network requirement.

4. The computer-implemented method of claim 3 wherein the at least one compute requirement includes one or more of:
   at least one physical hardware requirement; and
   at least one virtual machine.

5. The computer-implemented method of claim 4 wherein the at least one storage requirement includes one or more logical storage units associated with the at least one virtual machine.

6. The computer-implemented method of claim 4 wherein the at least one storage requirement includes one or more logical storage units associated with one or more application servers external to the network appliance.

7. The computer-implemented method of claim 1, wherein configuring the potential disaster recovery target as a disaster recovery site for the network appliance includes reserving computer resources within the potential disaster recovery target for exclusive use by the disaster recovery site.

8. A computer program product residing on a non-transitory computer readable medium having a plurality of instructions stored thereon which, when executed by a processor, cause the processor to perform operations comprising:
   identifying one or more disaster recovery requirements for a network appliance, wherein the network appliance includes both storage functionality and compute functionality;
   providing the one or more disaster recovery requirements to a plurality of potential disaster recovery targets for the network appliance;
   analyzing the plurality of potential disaster recovery targets to determine if any of the potential disaster recovery targets meet the one or more disaster recovery requirements of the network appliance;
   if one of the potential disaster recovery targets individually meets the one or more disaster recovery requirements, configuring the potential disaster recovery target as a disaster recovery site for the network appliance, wherein configuring the potential disaster recovery target as a disaster recovery site for the network appliance includes:
      maintaining a current copy of data stored within the network appliance on the disaster recovery site, and
      maintaining a current copy of one or more virtual machines executed on the network appliance on the disaster recovery site; and
   if none of the potential disaster recovery targets individually meets the one or more disaster recovery requirements, configuring a combination of the plurality of potential disaster recovery targets as a disaster recovery site for the network appliance, wherein configuring the combination of the plurality of potential disaster recovery targets as a disaster recovery site for the network appliance includes:
      maintaining a current copy of data stored within the network appliance on the disaster recovery site, and
      maintaining a current copy of one or more virtual machines executed on the network appliance on the disaster recovery site.

9. The computer program product of claim 8 wherein the network appliance is a hyperconverged network storage system that includes a hypervisor for executing one or more virtual machines.

10. The computer program product of claim 8 wherein the one or more disaster recovery requirements includes one or more of:
   at least one storage requirement;
   at least one compute requirement; and
   at least one network requirement.

11. The computer program product of claim 10 wherein the at least one compute requirement includes one or more of:
   at least one physical hardware requirement; and
   at least one virtual machine.

12. The computer program product of claim 11 wherein the at least one storage requirement includes one or more logical storage units associated with the at least one virtual machine.

13. The computer program product of claim 11 wherein the at least one storage requirement includes one or more logical storage units associated with one or more application servers external to the network appliance.

14. The computer program product of claim 8, wherein configuring the potential disaster recovery target as a disaster recovery site for the network appliance includes reserving computer resources within the potential disaster recovery target for exclusive use by the disaster recovery site.

15. A computing system including a processor and memory configured to perform operations comprising:
   identifying one or more disaster recovery requirements for a network appliance, wherein the network appliance includes both storage functionality and compute functionality;
   providing the one or more disaster recovery requirements to a plurality of potential disaster recovery targets for the network appliance;
   analyzing the plurality of potential disaster recovery targets to determine if any of the potential disaster recovery targets meet the one or more disaster recovery requirements of the network appliance;

if one of the potential disaster recovery targets individually meets the one or more disaster recovery requirements, configuring the potential disaster recovery target as a disaster recovery site for the network appliance, wherein configuring the potential disaster recovery target as a disaster recovery site for the network appliance includes:

maintaining a current copy of data stored within the network appliance on the disaster recovery site, and maintaining a current copy of one or more virtual machines executed on the network appliance on the disaster recovery site; and if none of the potential disaster recovery targets individually meets the one or more disaster recovery requirements, configuring a combination of the plurality of potential disaster recovery targets as a disaster recovery site for the network appliance, wherein configuring the combination of the plurality of potential disaster recovery targets as a disaster recovery site for the network appliance includes:

maintaining a current copy of data stored within the network appliance on the disaster recovery site, and maintaining a current copy of one or more virtual machines executed on the network appliance on the disaster recovery site.

16. The computing system of claim 15 wherein the network appliance is a hyperconverged network storage system that includes a hypervisor for executing one or more virtual machines.

17. The computing system of claim 15 wherein the one or more disaster recovery requirements includes one or more of:
   at least one storage requirement;
   at least one compute requirement; and
   at least one network requirement.

18. The computing system of claim 17 wherein the at least one compute requirement includes one or more of:
   at least one physical hardware requirement; and
   at least one virtual machine.

19. The computing system of claim 18 wherein the at least one storage requirement includes one or more logical storage units associated with the at least one virtual machine.

20. The computing system of claim 18 wherein the at least one storage requirement includes one or more logical storage units associated with one or more application servers external to the network appliance.

21. The computing system of claim 15, wherein configuring the potential disaster recovery target as a disaster recovery site for the network appliance includes reserving computer resources within the potential disaster recovery target for exclusive use by the disaster recovery site.

* * * * *